United States Patent Office 2,793,491
Patented May 28, 1957

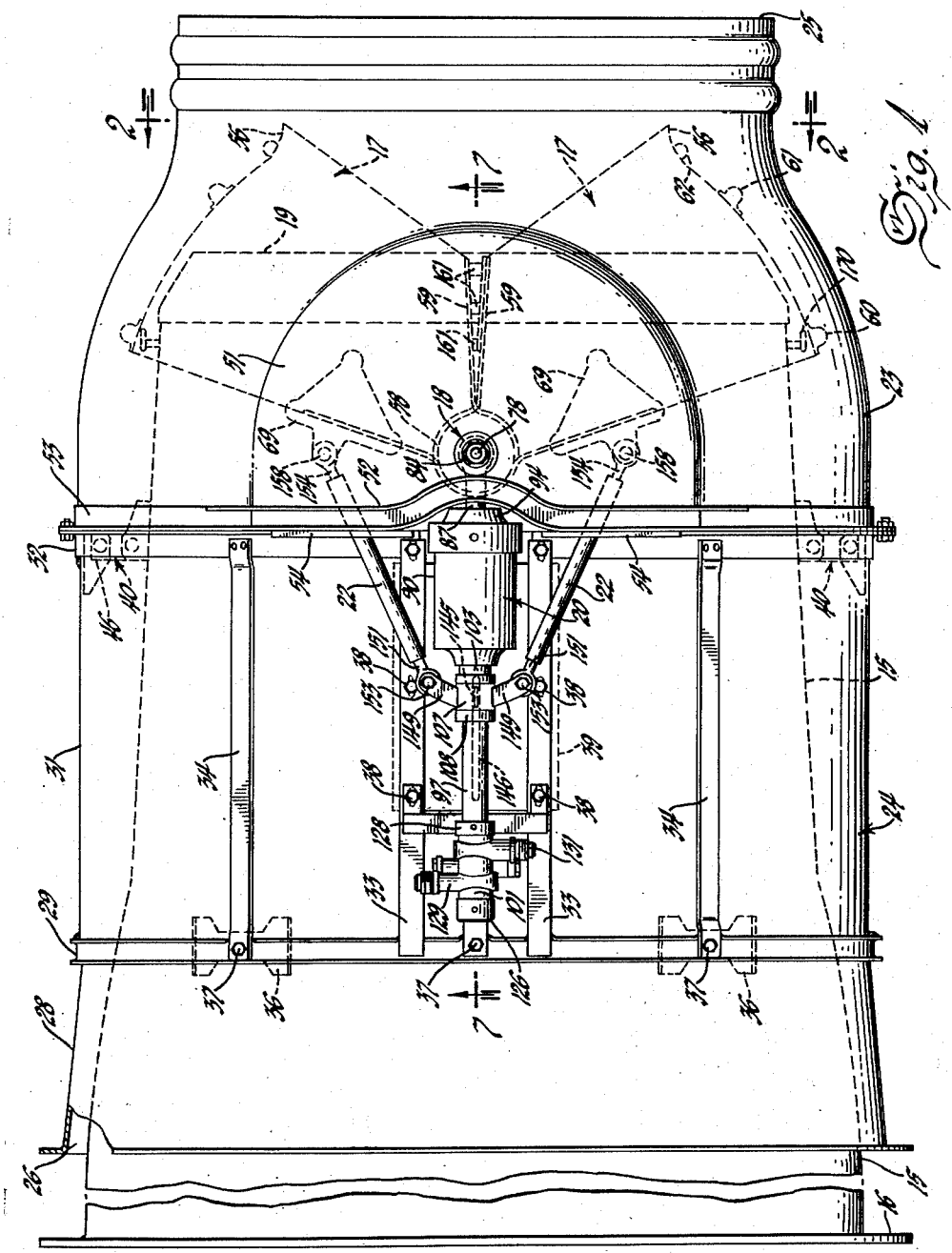

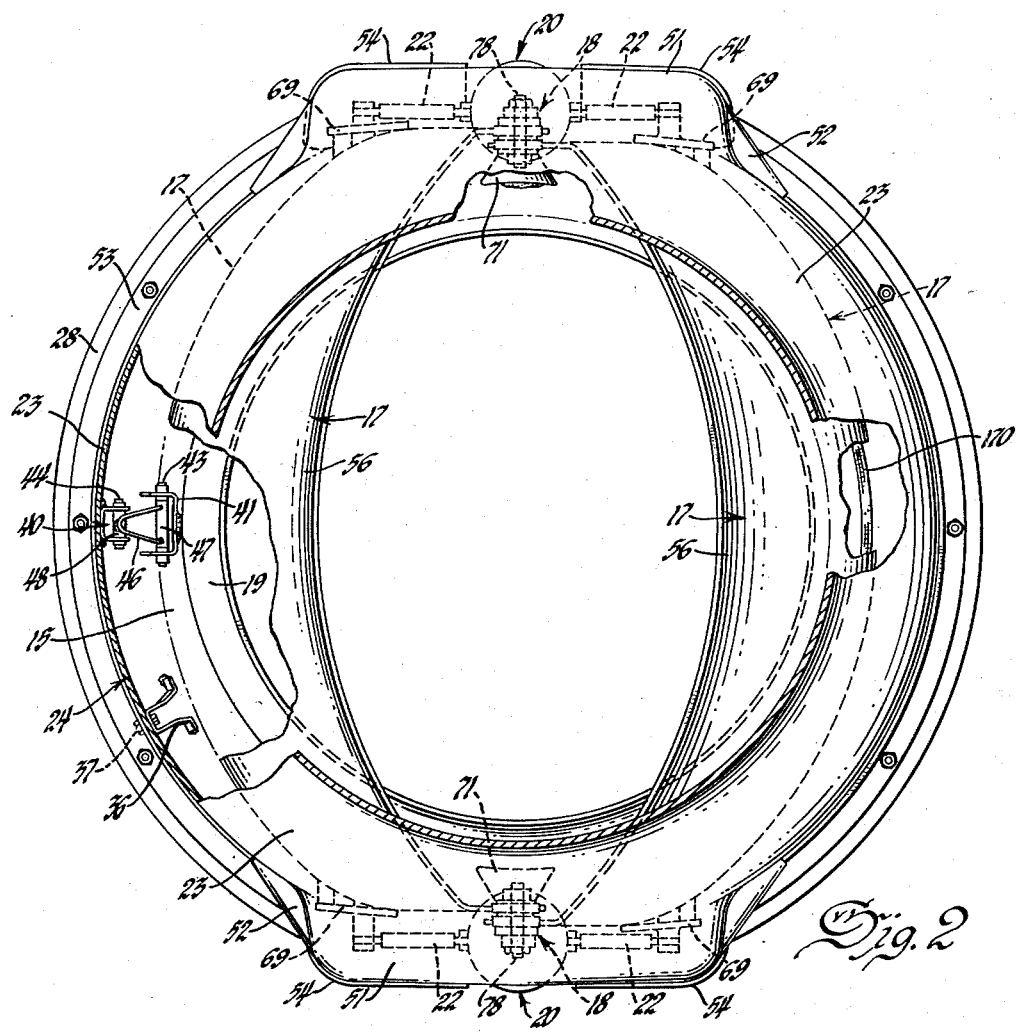
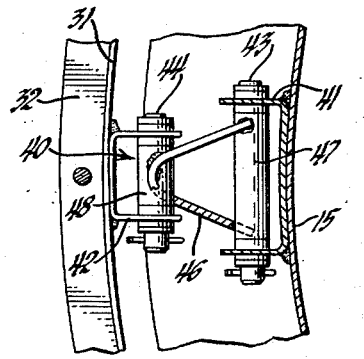

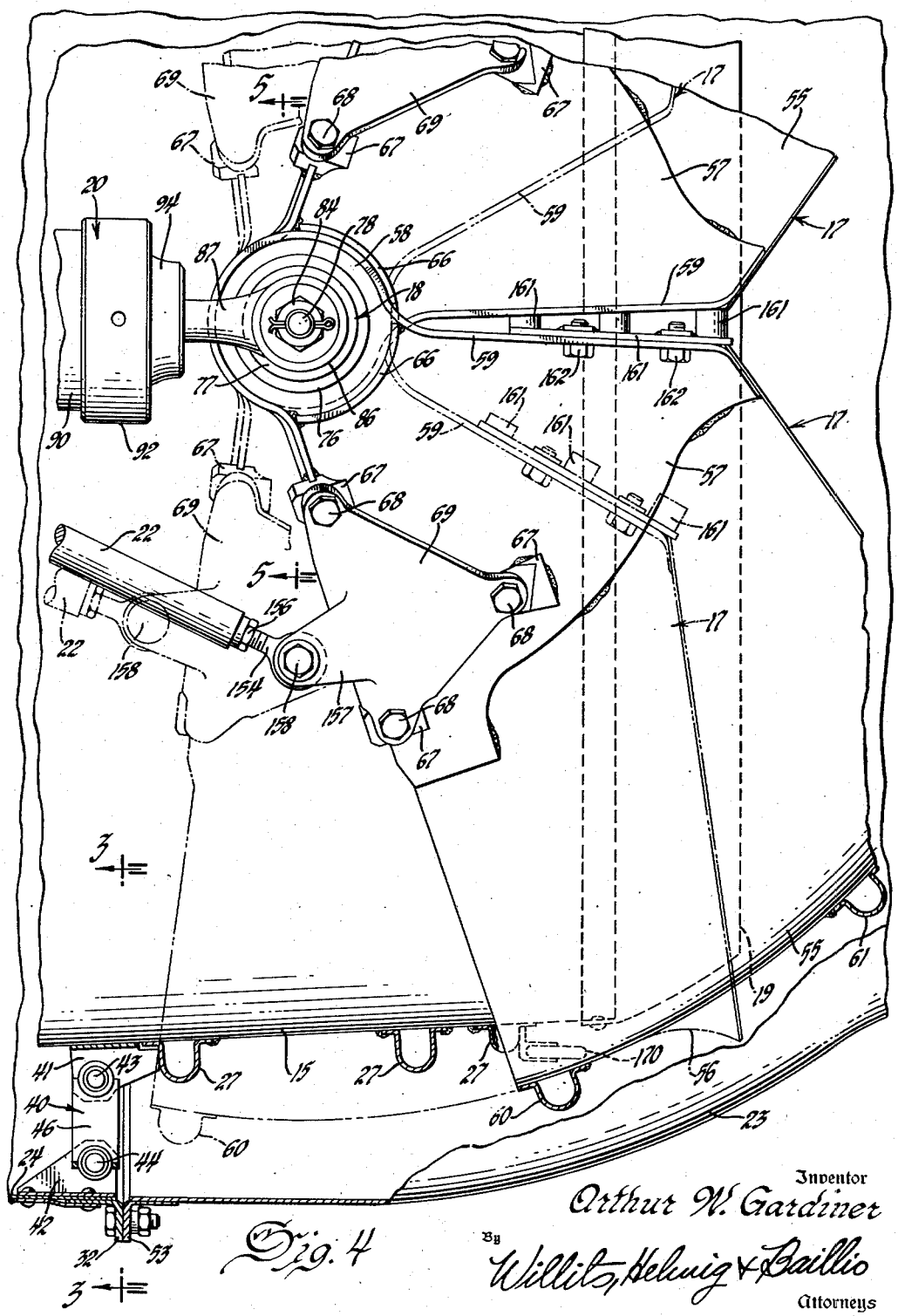

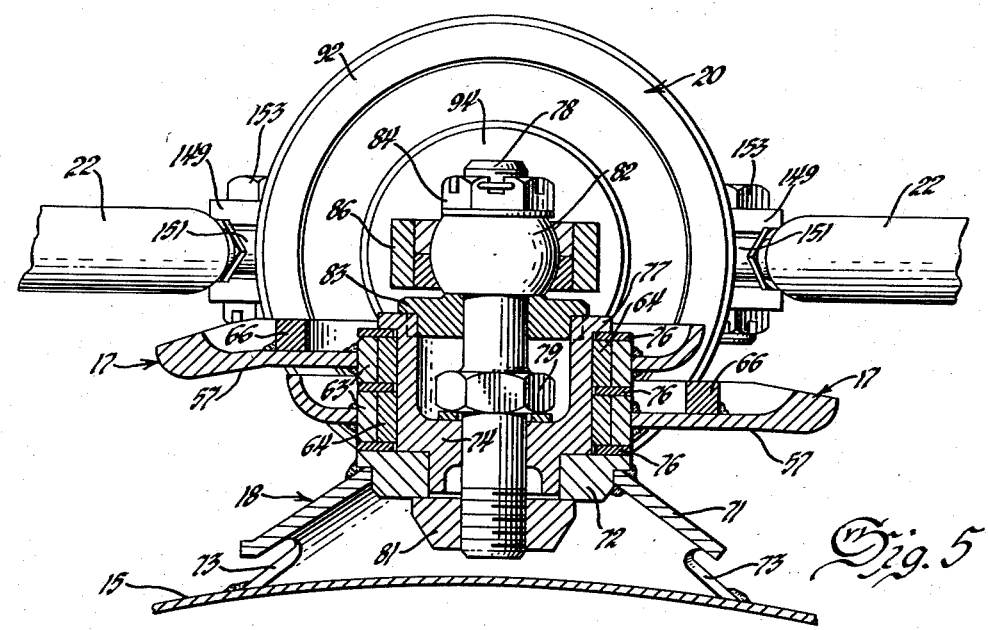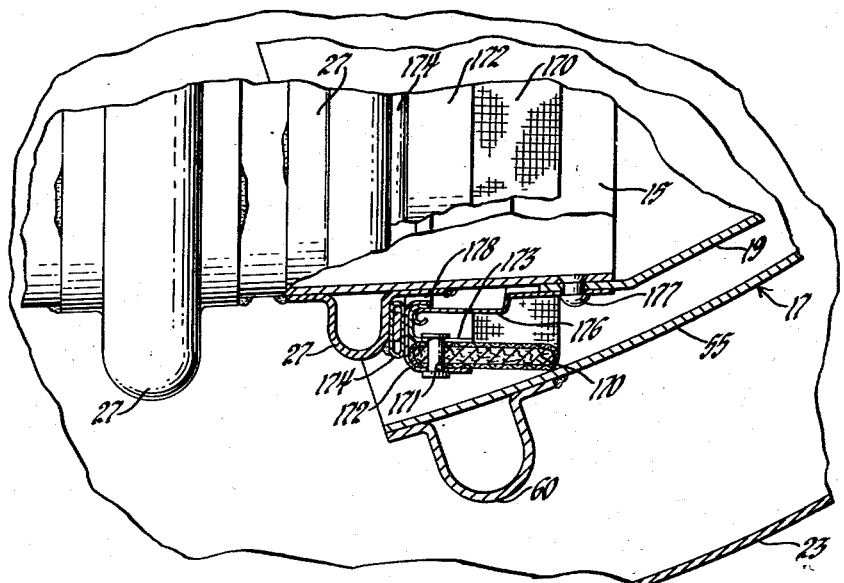

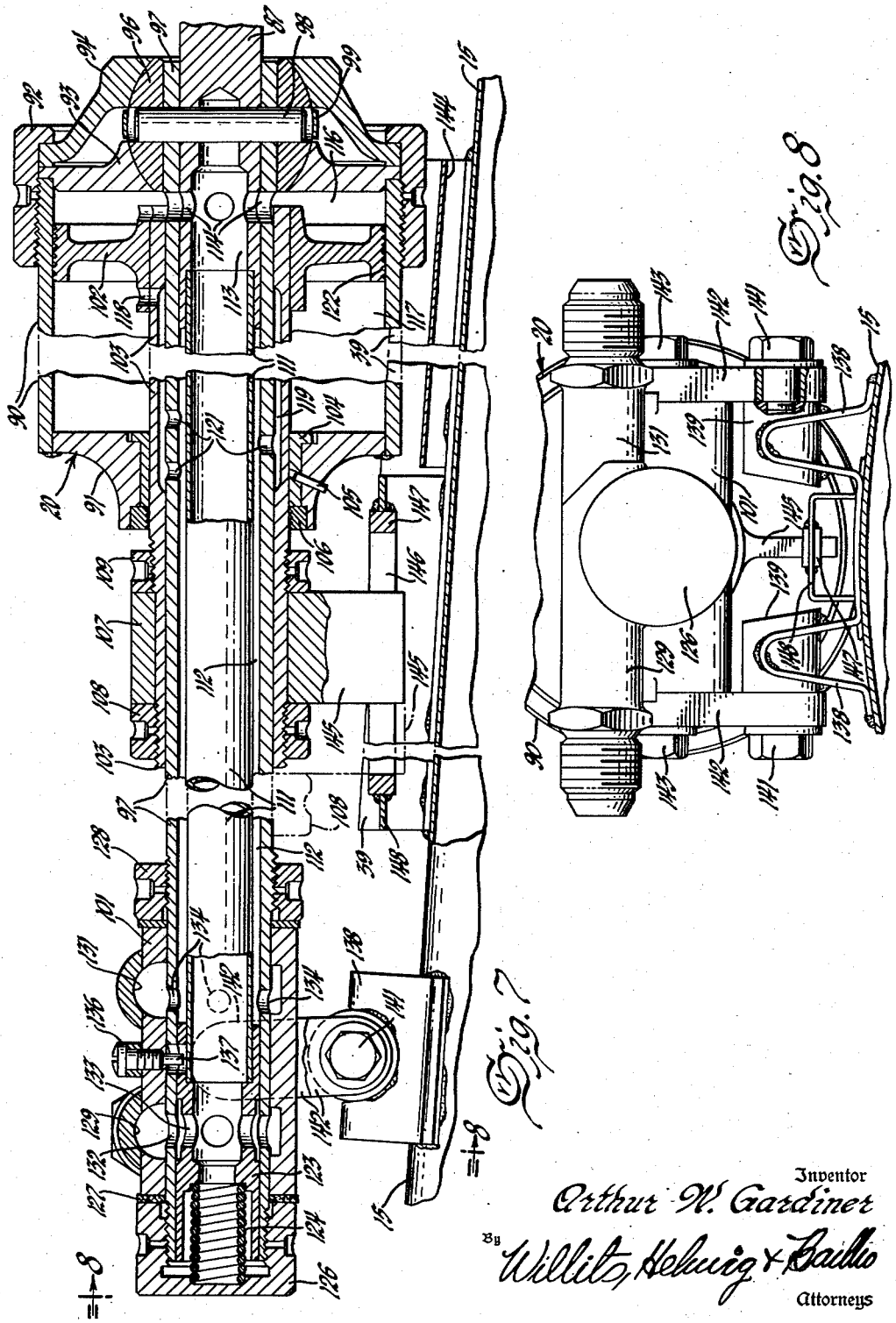

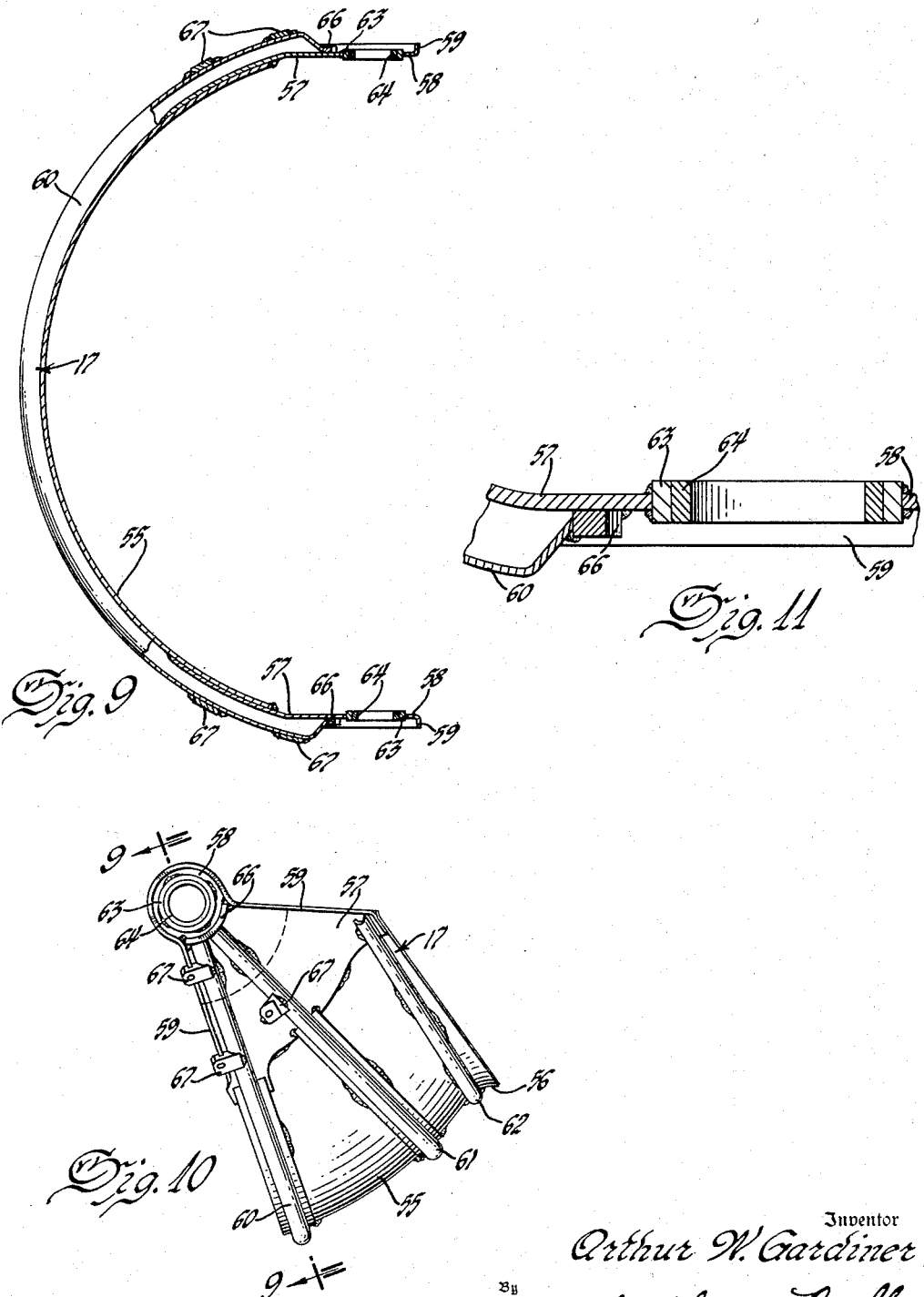

---

2,793,491

VARIABLE AREA JET NOZZLE

Arthur W. Gardiner, Indianapolis, Ind., assignor to General Motors Corporation, Detroit, Mich., a corporation of Delaware Application December 7, 1950, Serial No. 199,701

14 Claims. (Cl. 60—35.6)

---

This invention relates to variable propulsion nozzles for use with jet propulsion engines.

It has been generally recognized that the operating characteristics of jet propulsion engines, such as gas turbine jet engines, may be improved by the provision of means for varying the area of the jet nozzle, and many structural arrangements for this purpose have been proposed.

Notwithstanding the benefits to be gained from a variable nozzle, structures for this purpose hitherto proposed, which have been numerous and of various types, have not been generally adopted, because of various faults and deficiencies of the prior variable nozzles.

Certain turbojet installations have incorporated an afterburner, in which fuel is burned in the exhaust conduit of the engine, thus heating and expanding the combustion gases after their passage through the turbine. Where an afterburner is installed, it has been deemed necessary to provide an exhaust nozzle of the two-position type by virtue of which the area of the gas jet orifice may be set at either of two values. The jet opening is restricted under normal operating conditions, and is enlarged when the afterburner is in operation. Nozzles of this type do not provide for intermediate values of area of the jet nozzle.

The provision of a variable jet nozzle which is acceptable for aircraft use presents a difficult problem which, as stated above, has not hitherto been satisfactorily solved. The jet pipes are of considerable size, ordinarily about two feet in diameter. The temperature of the gases is usually of the order of 1200 degrees F., and the pressure and velocity of the gas are high. Obviously, a satisfactory aircraft structure must be light in weight and highly reliable.

My invention is directed to a jet propulsion nozzle for aircraft use which is continuously variable over a considerable range, which is light in weight and strong and reliable structurally, and which is not affected adversely by the high temperatures and pressures of the gases or by differential thermal expansion. The variable nozzle of the invention is applicable to engines with and without afterburners and, by virtue of numerous ingenious, novel, and highly advantageous features, provides a fully satisfactory solution to the problem of providing a variable jet nozzle for aircraft jet propulsion.

The principal objection of the invention is to provide an improved variable jet propulsion nozzle. Other objects are to provide a nozzle of simple and rugged construction, a nozzle which is sealed throughout its range of areas, and a construction particularly adapted to withstand high temperatures. A further object is to provide an improved operating mechanism for a variable nozzle. Other objects and advantages of the invention will be apparent to those skilled in the art from the detailed description herein of the preferred embodiment of the invention.

Referring to the drawings: Figure 1 is a plan view of the preferred embodiment of the invention; Figure 2 is an elevation of the outlet end of the nozzle assembly; Figure 3 is a fragmentary view taken on the plane indicated in Figure 4; Figure 4 is an enlarged partial plan view with parts cut away; Figure 5 is a sectional view of the pivot arrangement for the valve members and adjacent structure, taken on the plane indicated in Figure 4; Figure 6 is a view, partly in section, illustrating the seal for the valve member; Figure 7 is a longitudinal sectional view of one of the operating cylinder assemblies, taken on the plane indicated in Figure 1; Figure 8 is a front elevation view of the cylinder assembly; Figure 9 is a sectional view of one of the valve members taken on the plane indicated in Figure 10; Figure 10 is a plan view of a valve member; and Figure 11 is an enlarged view of a portion of Figure 9.

Referring first to Figure 1, the preferred embodiment of the invention comprises a tail pipe or jet pipe 15 which conveys the propulsive exhaust of a turbojet engine or other jet propulsion engine (not shown). The engine is not illustrated because the structure of such engines is well known and the details of the engine are immaterial to the invention. Such engines customarily are provided with a section of duct which receives the turbine exhaust and is fitted with a coupling flange to which the flange 16 at the forward end of the jet pipe may be attached. The jet pipe 15 may be of any desired length or diameter to suit the particular installation.

Two valve members 17, the inner surfaces of which are of spherical form, are rotatably mounted on pivots, one of which is indicated generally at 18, the pivots being aligned with a diameter of the jet pipe. The valve members are shown in their closed position, in which the opening between them is a minimum, and may be swung outwardly, as indicated by the broken lines in Figure 4, to clear the nozzle 19 at the end of the tail pipe. The valve members, which will be referred to as valves for conciseness, are actuated by two air cylinders 20, the piston rods of which are coupled by pull rods or links 22 to the valves. The outlet end of the jet pipe 15 and the valves 17 are enclosed in an annular shroud 23 which terminates in a jet propulsion nozzle 25. The shroud 23 is bolted to a forward shroud 24 mounted on and spaced from the jet pipe 15, which encloses the jet pipe except where the actuating cylinder assemblies 20 are mounted.

As illustrated, the axis on which the valves rotate is vertical, but it will be understood that this axis may be horizontal or otherwise oriented.

The forward shroud 24 provides for circulation of air around the jet pipe for cooling, which air may be admitted through the annular opening 26 between the shroud and the jet pipe. The after shroud 23 is open at the forward end for entrance of air from the shroud 24 and around the cylinders 20 and the links 22. The high velocity jet issuing from the exhaust end 19 of the jet pipe inspires air into the interior of the shroud 23 and thus draws cooling air through this shroud and the forward shroud 24.

Considering now the structure more fully, we may start with the jet pipe 15 which may be regarded as the basic structural element or framework of the mechanism. As will be apparent from Figure 1, the jet pipe converges gradually and terminates in a rapidly converging outlet nozzle portion 19 in form of a spherical zone. The pipe 15 is preferably circular and may be stiffened by welded ribs 27 (Fig. 4) to provide greater rigidity. The forward shroud 24 comprises an entrance portion 28 which is preferably circular in cross section and tapers slightly. This section 28 terminates at a stiffening ring 29 at which it is joined to the portion 31 of the shroud as by welding or the like. The portion 31 is welded to a flanged ring 32 at the rear end thereof, longitudinal stiffeners 33 and 34 extending from the ring 29 to the ring 32. The section 31 is cylindrical in form except that it is open between the stiffeners 33. The shroud is fixed to the jet pipe at the plane of the ring 29 by means of a number of two-legged brackets 36 (Figs. 1 and 2) welded to the jet pipe, the outer ends of which are reinforced and tapped for cap screws 37. The edges of the shroud portion 31 strengthened by the strips 33 are secured by shouldered cap screws 38 which pass through elongated holes in the shroud and are received in ribs 39 (Fig. 7) running longitudinally of the jet pipe. By virtue of the headed screws and the elongated slots, differential longitudinal expansion of the shroud and jet pipe may occur.

The after end of the shroud 31 is supported from the tail pipe at a number of points in the plane of the flange ring 32 by bracket assemblies 40 (Figs. 1 to 4). As shown most clearly in Figure 3, each support comprises a bracket 41 welded to the jet pipe 15 and a bracket 42 welded to the shroud portion 31. The legs of the U-shaped brackets are reinforced and are drilled for hinge pins 43 and 44. The assemblies are joined by rocker arms comprising V-shaped sheet metal members 46 welded to tubes 47 and 48 through which the pins 43 and 44 pass. As will be apparent, the jet pipe becomes hotter in operation than the shroud, and expansion of the jet pipe is permitted by the rotation of the rocker arms.

The forward end of the after shroud 23 is circular in section except adjacent the pivots 18, where it is bulged out as indicated at 51. The portions 51 are reinforced at the forward edge by stiffening channels 52. The remainder of the forward edge of the after shroud is fitted with a flange 53 by which it is bolted to the flange 32 of the forward shroud and is thus supported. Deflector plates 54 (Fig. 1) may be mounted so as to partly close the entrance into the shroud 23 and concentrate the air flow adjacent the cylinder 20.

The valves 17 are most clearly shown in Figures 4 and 9 to 11. The two valves are identical, each comprising a main body portion 55 in the form of a portion of a spherical surface, as illustrated, with a slight flare 56 at the discharge end. The part 55 is fixed to a dished plate 57 of generally triangular form which constitutes the pivot number of the valve. The plate 57 comprises a generally circular extension 58 and the margin of the member 57 is stiffened by a flange 59. Circumferential strengthening ribs 60, 61, and 62 are welded to the valve. As will be most clearly apparent in Figure 11, a ring 63 is welded in a circular opening in the part 58 and a bearing bushing 64 is pressed into the ring 63. An arcuate reinforcing block 66 is welded to the plate 57 across the gap between the flanges 59. Three blocks 67 (Figs. 10 and 4) are welded to the valve and are tapped to receive cap screws 68 by which a triangular fitting 69 is secured to the valve. This fitting serves to connect the valve to the actuating link 22, as will be more fully described.

The pivot arrangement 18 for the valves is best illustrated in Figure 5. Each of the two supports for the valve pivots comprises a cone 71 welded to the jet pipe 15, to the outer end of which is welded a ring 72. Openings 73 are provided in the cone for ventilation. The ring 72 provides a shoulder and a pilot bore for a pivot member 74 on which the bearing bushings 64 of the valve 17 rotate. These valves are identical and the bearings are located slightly asymmetrically with respect to the center of the sphere, so that one pivot bushing of a particular valve is adjacent one ring 72 and the pivot bushing of the other valve lies adjacent the other ring 72, as shown in Figure 2. Thrust washers 76 are fitted between the ring 72 and the adjacent bearing, between the two bearings, and between the outer bearing and the flange 77 of the pivot 74. The pivot 74 is inserted with the valves in place and is retained by a stud 78 formed with a hexagonal intermediate flange 79. The stud passes through a bore in the journal member and is retained by a nut 81 which may be inserted through one of the openings 73.

The stud 78 also provides a point of attachment for the cylinder assembly 20 (Figs. 4 and 5). This attachment involves a ball joint fitting. The ball 82 is mounted on the stud 78 between a collar 83 engaging the outer end of the pivot member 74 and a nut 84 threaded on the outer end of the stud 78. The collar 83 is held against rotation by mating teeth or splines on the collar and on pivot member 74. The ring member 86 of the ball fitting, which is fitted on the ball 82 for universal rotation, is integral with a tapering rod 87 (Fig. 4) which takes the thrust of the cylinder 20 and supports the cylinder.

The structure and mounting of each air cylinder assembly 20 is most fully shown in Figures 7 and 8. The cylinder assembly is mounted to provide for expansion of the jet pipe 15 from which it is supported and to eliminate stresses in the jet pipe due to the thrust of the cylinder. The thrust of the cylinder is exerted through the pull rod 87 on the pivot assembly 18 for the valves, and on the valves through the links 22 which are coupled to the piston of the cylinder as will be explained. The cylinder is supported by the rod 87 and by a linkage arrangement which locates the other end of the cylinder assembly on the jet pipe but does not transmit any thrust.

The cylinder assembly 20 comprises a cylinder wall 90 welded or brazed to a head 91. The cylinder 90 is threaded for a collar 92 which retains the right-hand cylinder head and may be tightened by a spanner wrench. This cylinder head comprises two disks 93 and 94 which are internally formed to a common spherical surface which receives a ball 96 mounted on the rod 87. The rod 87 fits within a tube 97 on which the ball 96 is fitted and the members 87, 96, and 97 are held assembled by a transverse pin or key 98. A ring 99 disposed around the ball 96 between the disks 93 and 94 prevents the pin from slipping out. By virtue of this arrangement, the cylinder assembly 20 is flexibly mounted with relation to the shaft 87 and tube 97 so that the cylinder 90 may align itself with the moving parts of the cylinder assembly and thus mitigate binding therebetween.

The rod 87 and tube 97 constitute the support for the cylinder, the tube 97 extending to the left of the cylinder and passing through an air inlet fitting 101 which is slipped over the tube 97. The fitting 101 is supported on the jet pipe 15 by a linkage arrangement which aligns the cylinder but permits relative expansion of the jet pipe, as will be explained more fully.

A piston 102 reciprocable in the cylinder is fixed to a tubular piston rod 103 which slides on the outer surface of the tube 97. The piston rod slides in a bushing 104 retained in the cylinder head 91 by a pin 105 and an internally serrated collar 106 pressed into the cylinder head which acts as a labyrinth seal. The piston rod is coupled to the links 22 by a crosshead 107, the body of which is fitted on a reduced portion of the piston rod 103 between threaded collars 108 and 109. Air is supplied to the cylinder 20 through a tube 111 mounted concentrically in the tube 97 and through the annular space 112 between the tubes 97 and 111. One end of the tube 111 is piloted in the counterbored end of the rod 87, which is drilled to provide a longitudinal passage 113. Radial passages 114 through the rod 87 and tube 97 connect the passage 113 with the chamber 116 at the right-hand end of the cylinder as viewed in Figure 7. The chamber 117 in the other end of the cylinder is supplied with air through radial ports 118 in the hub of the piston 102 and the piston rod 103. The interior of the piston rod is bored out to form a passage 119 which registers in all positions of the piston with radial ports 121 in the tube 97. The periphery of the piston 102, which does not contact the cylinder, is grooved, as indicated at 122, to form a labyrinth seal which permits a larger clearance between the piston and the cylinder wall for a given desired through flow of air for cooling the cylinder assembly.

The forward end of the tube 111 is piloted in a tubular plug 123 slidably mounted in the tube 97 and urged into engagement with the tube 111 by a coil spring 124 retained by a cap 126 which seals the outer end of the tube 97 and serves also as one retaining means for the air inlet fitting 101. The cap 126 is threaded into the end of tube 97, and a solid metal gasket 127 is compressed between the cap and the air inlet fitting 101. This fitting is also retained by a collar 128 threaded on the tube 97 which may be tightened against a solid metal gasket abutting the after end of the fitting 101.

The fitting 101 comprises a tubular body with air inlet connections 129 and 131 extending laterally from the body, these extensions being provided with threaded fittings to connect to air hoses or the like. The air inlet 129 communicates with the interior of the tube 111 through radial passages 132 and 133 in the tube 97 and plug 123 respectively, and the air inlet 131 communicates with the annular passage 112 through radial passages 134 in the tube 97. A retaining screw 136 threaded in the body 101 is formed with a reduced end portion 137 which enters openings in the tube 97 and plug 123, these openings being larger than the pin 137 so that some latitude in the mounting of the block 101 is permitted and the plug 123 may reciprocate to a limited extent in the tube 97. Provision is made for relative expansion of the tubes 97 and 112 because they may be at different temperatures.

The inlet fitting 101 is supported from the jet pipe 15 by a linkage comprising a bracket 138 welded to the jet pipe to which are welded tapped blocks 139. Shouldered machine screws 141 threaded into the blocks 139 serve as fulcrums for links 142 which are pivotally connected to the air inlet fitting 101 by shouldered machine screws 143. By the rocking action of the links 142, relative expansion of the jet pipe 15 and the cylinder assembly is permitted, but the cylinder is supported and held in proper alignment by the links. A heat shield 144 is disposed between the jet pipe 15 and the cylinder 20.

Considering now the crosshead 107, the mounting of this crosshead on the piston rod 103 has been described. The crosshead is restrained against rotation about the axis of the cylinder by a blade 145 integral with the crosshead which reciprocates in a slot 146 in an elongated block 147 welded into a plate 148 fixed to the jet pipe 15.

Referring to Figures 1 and 5, the crosshead 107 is formed with two arms 149, the outer ends of which are clevised to receive ball joint eye fittings 151 on the ends of the links 22. Pins 153 couple the arms 149 to the links 22.

Ball joint fittings 154 (Fig. 4) are threaded into the valve ends of the links 22 so that the overall length of the link may be adjusted, and are locked by jam nuts 156. The fittings 69 on the valves are formed with clevised extensions 157 to receive the fittings 154, these parts being coupled by pins or bolts 158.

When the valves 17 are opened, the outlet 19 of the jet pipe is fully open. The minimum opening of the jet pipe is fixed by stop members 161, secured to the flanges 59 of one valve by machine screws 162, which engage the flanges 59 of the other valve member.

A seal 170 (Figs. 4 and 6) is provided between the after end of the jet pipe 15 and the interior of the valves 17 to prevent gas under pressure from the jet pipe from blowing forward between the nozzle portion 19 and the valve portion 55. This seal must stand high temperatures and considerable pressure, must be sufficiently flexible to tolerate some distortion of the valves or tail pipe, and must not offer too great frictional resistance to movement of the valves. The seal comprises a cylindrical ring 170 of suitable flexible material which bears at its rear edge against the interior of the valve shells 55. The ring 170 is clamped by rivets 171 between the flanges of two nested channel rings 172 and 173 formed of thin sheet metal. The base portion of the outer channel 172 abuts a gasket ring 174, the forward face of which lies against the rear face of the aftermost stiffener ring 27. The seal 170 is held against axial displacement by sheet metal clips 176 secured to the jet pipe 15 by rivets 177. The inner flanges of the channels 172 and 173 lie between the clips 176 and the flange of the stiffener 27 and are piloted on the latter with slight radial clearance, as indicated at 178. The preferred material for the seal ring 170 is a commercially available material comprising an Inconel wire braid over a core of asbestos or the like.

It will be noted that pressure within the shell 55 will be exerted within the seal ring 170 and will urge the non-restricted rear periphery of the seal ring outwardly against the valve member. This pressure will also urge the seal ring forwardly against the gasket 174.

It is believed that the operation of the device will be clear to those skilled in the art from the foregoing, but it may be described briefly. With the apparatus installed at the outlet end of the exhaust passage of a gas turbine engine, the effective area of the exhaust opening or nozzle may be varied to secure the desired conditions of engine operation.

The cylinder 20 is coupled to a suitable source of air under pressure in the airplane which may be, for example, air bled from the compressor of a gas turbine engine. The air may be supplied to the cylinder through a standard commercial reversing valve, or by any suitable automatic mechanism if desired (not shown), so that air may be supplied to either of the chambers 116 and 117 and be vented from the other chamber. When air is supplied to the connection 129 and through the tube 111 to the chamber 116, the crosshead 107 is moved forward, pulling on the links 22 and opening the valves 17. If it is desired to close the valves, air is supplied through the connection 131 and passage 112 to the chamber 117 and vented from the chamber 116. The crosshead moves rearwardly, pushing on the links 22 to close the valves. Since the sealing action is continuous, the valves may be stopped at any point in their range of travel and retained in such position by air pressure in the appropriate chamber of the cylinder maintained by bleeding air into the cylinder from the source. The slight leakage of air across the piston maintains an air circulation in the cylinder 20 sufficient to prevent overheating of the cylinder, in connection with the air circulation over the cylinder.

Because of the spherical form of the valves, the jet does not exert any significant force tending to open or close the valves. The escaping jet draws air through the opening 26 to circulate through the shroud 24 around the jet pipe for cooling and also into the open front of the expanded portion 51 of the rear shroud. The air thus drawn in, which is sufficient for cooling the device, is ejected through the outlet 25 by the high-velocity jet escaping from the nozzle 19, passing over and cooling the valves 17.

It will be apparent that a control valve of the servo type (not shown) for the cylinder 20 would preferably be employed so as automatically to maintain the crosshead 107 and thus the valve members in any desired position without attention from the pilot. The valve arrangement is not illustrated, since such installations are commonly understood and widely available, and details thereof are immaterial to the invention. It will be apparent that oil or other liquid could be employed to actuate the cylinder 20.

It will be noted that the flexible construction and mounting of the cylinder assembly 20 with the somewhat loose fit of the piston 102 prevents binding of the cylinder by deflection of the tube 97 due to unbalanced resistance to movement by the valves 17 or other causes. The mounting of the cylinder is particularly adapted to allow for expansion or distortion of the structure and to avoid stresses in the structure of the jet pipe, which is at a high temperature during the operation of the engine. If afterburning is employed, the temperature of the gas in the jet pipe may be about 2400° F. The cylinder will be cooled by air drawn into the after shroud 23 and by the air circulation within the cylinder.

The advantages of the preferred structure from such standpoints as strength, reliability, and light weight will be apparent to those skilled in the art.

The detailed description of the preferred embodiment of the invention is not to be considered as limiting the scope of the invention, as many variations of form may be made within the scope of the invention.

I claim:

1. A jet propulsion apparatus comprising, in combination, a jet pipe, shaft means defining an axis of rotation adjacent the outlet of the pipe and normal to the axis of the pipe, two opposed valve members rotatably mounted on said shaft means for variably restricting the said outlet, an expansive chamber motor comprising two axially slidable parts, one part being attached to the jet pipe at the axis of the shaft means, and means coupling the other part of the motor to the valve members.

2. A jet propulsion apparatus comprising, in combination, a jet pipe, shaft means defining an axis of rotation adjacent the outlet of the pipe and normal to the axis of the pipe, two opposed valve members rotatably mounted on said shaft means for variably restricting the said outlet, the interior surface of each valve member being a surface of revolution about the axis of rotation, a seal on the jet pipe engaging each valve member throughout its range of rotation, an expansive chamber motor comprising two axially slidable parts, one part being attached to the jet pipe at the axis of the shaft means, and means coupling the other part of the motor to the valve members.

3. A jet propulsion apparatus comprising, in combination, a jet pipe, shaft means defining an axis of rotation adjacent the outlet of the pipe and normal to the axis of the pipe, two opposed valve members rotatably mounted on said shaft means for variably restricting the said outlet, the interior surface of each valve member being a surface of revolution about the axis of rotation, a seal on the jet pipe engaging each valve member throughout its range of rotation, a motor comprising two relatively movable parts, one part being attached to the jet pipe at the axis of the shaft means, means coupling the other part of the motor to the valve members, and a cooling air shroud enclosing the exhaust end of the jet pipe and the motor and the valve members and defining a jet propulsion nozzle.

4. A variable area jet nozzle device comprising, in combination, a jet pipe terminating in a nozzle, two valve members mounted for rotation about an axis transverse to the jet pipe to vary the effective area of the nozzle, the said axis being defined by pivot members extending from the jet pipe on which the valve members are rotatably mounted, a thrust member attached to the jet pipe at the axes of the pivot members extending forwardly of the jet pipe from each pivot member, a connection yieldable longitudinally of the jet pipe between the forward end of the thrust member and the jet pipe, an expansible-chamber motor associated with each thrust member comprising a part fixed longitudinally thereof and a part movable axially thereof, and means coupling the axially movable part to the valve members for rotation thereof about the said axis.

5. A variable area jet nozzle device comprising, in combination, a jet pipe terminating in a nozzle, two valve members mounted for rotation about an axis transverse to the jet pipe to vary the effective area of the nozzle, the said axis being defined by pivot members extending from the jet pipe on which the valve members are rotatably mounted, a thrust member extending forwardly of the jet pipe from each pivot member and rotatably secured to the pivot member, a connection yieldable longitudinally of the jet pipe between the forward end of the thrust member and the jet pipe, an expansible-chamber motor associated with each thrust member comprising a part fixed longitudinally thereof and a part movable axially thereof, means for restraining the axially movable part against rotation, and means coupling the axially movable part to the valve members for rotation thereof about the said axis.

6. A variable area jet nozzle device comprising, in combination, a jet pipe terminating in a nozzle, two valve members mounted for rotation about an axis transverse to the jet pipe to vary the effective area of the nozzle, the said axis being defined by pivot members extending from the jet pipe on which the valve members are rotatably mounted, a thrust member extending forwardly of the jet pipe from each pivot member and rotatably secured to the pivot member, a connection between the forward end of the thrust member and the jet pipe, an expansible-chamber motor associated with each thrust member comprising a cylinder fixed longitudinally thereof and flexibly mounted thereon and a piston movable axially thereof, the piston being relatively free in the cylinder, and means coupling the piston to the valve members for rotation thereof about the said axis.

7. A variable area jet nozzle device comprising, in combination, a jet pipe terminating in a nozzle, two valve members mounted for rotation about an axis transverse to the jet pipe to vary the effective area of the nozzle, the interior surfaces of the valve members being surfaces of revolution about the said axis, an abutment on the outer surface of the jet pipe, and a seal ring extending around the jet pipe and including an inwardly-directed flange on the forward edge thereof mounted to engage the rear face of the abutment, the rear edge of the seal ring engaging the interior surfaces of the valves, and the seal ring being mounted with freedom for radial movement relative to the jet pipe.

8. An expansible-chamber motor comprising, in combination, a longitudinal member, a hollow piston rod slidable on the member, a piston on the rod, a cylinder enclosing the piston including a head in which the piston rod is slidable and a closed head, a ball-and-socket connection between the closed head and the member, a thrust member on the longitudinal member extending outwardly from the closed end of the cylinder, the longitudinal member including a portion extending beyond the piston rod, and means for supporting the said portion.

9. An expansible-chamber motor comprising, in combination, a longitudinal member, a hollow piston rod slidable on the member, a piston on the rod, a cylinder enclosing the piston including a head in which the piston rod is slidable and a closed head, a ball-and-socket connection between the closed head and the member, a thrust member on the longitudinal member extending outwardly from the closed end of the cylinder, a crosshead on the piston rod, a guide therefor, the longitudinal member including a portion extending beyond the piston rod, and means for supporting the said portion.

10. A variable area jet nozzle device comprising, in combination, a jet pipe terminating in a nozzle, two valve members mounted for rotation about an axis transverse to the jet pipe to vary the effective area of the nozzle, the said axis being defined by pivot members extending from the jet pipe on which the valve members are rotatably mounted, a thrust member extending forwardly of the jet pipe from each pivot member and rotatably secured to the pivot member, a connection yieldable longitudinally of the jet pipe between the forward end of the thrust member and the jet pipe, an expansible-chamber motor associated with each thrust member, a hollow piston rod slidable on the thrust member, a piston on the rod, a cylinder enclosing the piston including a head in which the piston rod is slidable and a closed head, a ball-and-socket connection between the closed head and the thrust member, a crosshead on the piston rod, and means coupling the crosshead movable part to the valve members for rotation thereof about the said axis.

11. A jet propulsion apparatus comprising, in combination, a jet pipe, shaft means defining an axis of rotation adjacent the outlet of the pipe and normal to the axis of the pipe, two opposed valve members rotatably mounted on said shaft means for variably restricting the said outlet, an actuator comprising a piston and a cylinder, means coupling the piston to the valve members for concurrent rotation thereof about the said axis, and means coupling the cylinder to the jet pipe at the axis of the shaft means for transmission of the thrust of the actuator thereto.

12. A variable jet nozzle device comprising, in combination, a jet pipe terminating in a nozzle, two valve members mounted for rotation about an axis transverse to the jet pipe to extend variably over the nozzle to vary the effective area of the nozzle, the interior surfaces of the valve members being surfaces of revolution about the said axis, the valve members being radially spaced from the nozzle and the jet pipe, a seal ring extending around the jet pipe and bridging the space between the jet pipe and valve members, means at the forward edge of the seal ring sealingly connecting the seal ring to the jet pipe and locating the seal ring axially of the jet pipe, the last-mentioned means including parts on the jet pipe and seal ring relatively slidable radially of the jet pipe, the seal ring extending rearwardly from the connecting means, the rear edge of the seal ring being radially yieldable and being located so as to engage the interior surface of the valve members, the radially inner surface of the seal ring being in communication with the interior of the jet pipe so as to be exposed to pressure from the jet pipe, and the seal ring being urged radially outwardly against the interior surface of the valve members by the said pressure.

13. A variable jet nozzle device comprising, in combination, a jet pipe terminating in a nozzle, two valve members mounted for rotation about an axis transverse to the jet pipe to extend variably over the nozzle to vary the effective area of the nozzle, the interior surfaces of the valve members being surfaces of revolution about the said axis, the valve members being radially spaced from the nozzle and the jet pipe, a seal ring extending around the jet pipe and bridging the space between the jet pipe and valve members, means at the forward edge of the seal ring sealingly connecting the seal ring to the jet pipe and locating the seal ring axially of the jet pipe, the last-mentioned means including an abutment on the outer surface of the jet pipe having a radial rear face and an abutment on the seal ring having a radial front face slidable freely on the abutment on the jet pipe, the seal ring extending rearwardly from the connecting means, the rear edge of the seal ring being radially yieldable and being located so as to engage the interior surface of the valve members, the rear surface and radially inner surface of the seal ring being in communication with the interior of the jet pipe so as to be exposed to pressure from the jet pipe, and the seal ring being urged forwardly against the abutment and radially outwardly against the interior surface of the valve members by the said pressure.

14. A variable jet nozzle device comprising, in combination, a jet pipe terminating in a nozzle, two valve members mounted for rotation about an axis transverse to the jet pipe to extend variably over the nozzle to vary the effective area of the nozzle, the interior surfaces of the valve members being surfaces of revolution about the said axis, the valve members being radially spaced from the nozzle and the jet pipe, a seal ring extending around the jet pipe and bridging the space between the jet pipe and valve members, means at the forward edge of the seal ring sealingly connecting the seal ring to the jet pipe and locating the seal ring axially of the jet pipe, the last-mentioned means including an abutment on the outer surface of the jet pipe having a radial rear face and an abutment on the seal ring having a radial front face slidable freely on the abutment on the jet pipe, the seal ring extending rearwardly from the connecting means, the rear edge of the seal ring being located so as to engage the interior surface of the valve members, the rear surface and radially inner surface of the seal ring being in communication with the interior of the jet pipe so as to be exposed to pressure from the jet pipe, and the seal ring being urged forwardly against the abutment members by the said pressure.

References Cited in the file of this patent

UNITED STATES PATENTS

| Number | Name | Date |
|---|---|---|
| 714,269 | Walton | Nov. 25, 1902 |
| 2,396,319 | Edwards et al. | Mar. 12, 1946 |
| 2,487,588 | Price | Nov. 8, 1949 |
| 2,514,248 | Lombard et al. | July 4, 1950 |
| 2,523,842 | Oulianoff | Sept. 26, 1950 |
| 2,546,293 | Berliner | Mar. 27, 1951 |
| 2,551,372 | Haltenberger | May 1, 1951 |
| 2,551,453 | Mott | May 1, 1951 |
| 2,557,435 | Imbert | June 19, 1951 |
| 2,603,060 | Brown | July 15, 1952 |
| 2,630,673 | Woll | Mar. 10, 1953 |
| 2,635,419 | Ambrose et al. | Apr. 21, 1953 |